United States Patent
Fuller et al.

(10) Patent No.: US 8,542,469 B2
(45) Date of Patent: Sep. 24, 2013

(54) METHODOLOGY FOR PROTECTION OF CURRENT TRANSFORMERS FROM OPEN CIRCUIT BURDEN

(75) Inventors: Randy Fuller, Hillsburgh (CA); David Hodge, Oro Valley, AZ (US); James Lobsinger, Oro Valley, AZ (US)

(73) Assignee: Honeywell International, Inc., Morristown, NJ (US)

( * ) Notice: Subject to any disclaimer, the term of this patent is extended or adjusted under 35 U.S.C. 154(b) by 485 days.

(21) Appl. No.: 12/871,517

(22) Filed: Aug. 30, 2010

(65) Prior Publication Data

US 2012/0050923 A1    Mar. 1, 2012

(51) Int. Cl.
*H02H 7/04* (2006.01)

(52) U.S. Cl.
USPC .......................................................... 361/35

(58) Field of Classification Search
USPC .................................. 361/35, 38, 20; 307/18
See application file for complete search history.

(56) References Cited

U.S. PATENT DOCUMENTS

| | | | |
|---|---|---|---|
| 5,506,550 A | 4/1996 | Waters | |
| 5,594,285 A * | 1/1997 | Wisbey et al. | 307/18 |
| 6,028,422 A | 2/2000 | Preusse | |
| 7,525,297 B2 | 4/2009 | Gibellini | |
| 8,315,022 B2 * | 11/2012 | Scherzinger et al. | 361/38 |
| 2009/0309572 A1 | 12/2009 | Perry | |
| 2011/0242710 A1 * | 10/2011 | Scherzinger et al. | 361/20 |

* cited by examiner

*Primary Examiner* — Rexford Barnie
*Assistant Examiner* — Angela Brooks
(74) *Attorney, Agent, or Firm* — Shimokaji & Assoc., PC

(57) ABSTRACT

A protected electrical power system may comprise a feeder between a power source and an electrical load. A first current transformer may be positioned on the feeder in a first location. The first current transformer may have a shunt resistor electrically connected across its winding. A second current transformer may be positioned at a second location on the feeder. A control unit may be interposed between the first and second current transformers and may be interconnected with the first and second current transformers on current-monitoring loops independent from the feeder. The control unit may be responsive to a predetermined differential in feeder (DF) current between the first and second current transformers to disconnect the power source from the electrical load. The control unit may have a compensation network for reducing DF error resulting from presence of the shunt resistor in the first current transformer.

16 Claims, 7 Drawing Sheets

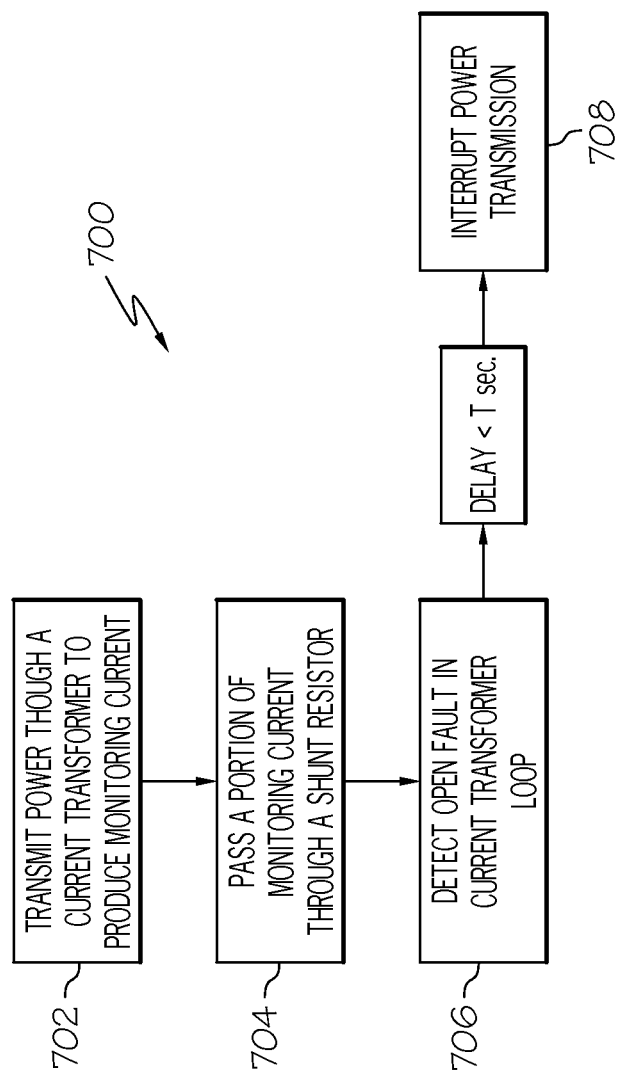

METHODOLOGY FOR PROTECTION OF CURRENT TRANSFORMERS FROM OPEN CIRCUIT BURDEN

BACKGROUND OF THE INVENTION

The present invention generally relates to electrical systems which employ current transformers. More particularly the present invention relates to current transformers employed as circuit protection devices.

In some electrical distribution systems a protection system may be used to assure that electrical failures of wiring may be isolated. For example, in an aircraft, protection may be established between a generator and one or more electrical loads that may receive current from the generator. In a typical three-phase system, first current transformers may be placed around output conductors at the generator. Second current transformers may be placed on the conductors at a position remote from the generator. A monitoring system may detect any current imbalance between the first and second current transformers if and when a fault may develop in a zone between the first and second current transformers.

Windings of the current transformers may be interconnected to a control unit which may operate disconnection contactors in the event of a fault. In this context, the windings may be considered to be connected to a load with low impedance. The current transformer design and the impedance of the control unit may be selected so that, in normal operation, the voltage developed across the windings does not exceed insulation breakdown limits of the windings.

It is possible that a so-called "open circuit" failure may occur in the control unit or in a current-monitoring loop between one of the current transformers and the control unit. In such an event, the impedance across a winding of the current transformer may become infinite. Continued passage of current from the generator to the electrical loads may then produce extremely high voltages across the winding. As a result of such high voltages, insulation in the winding may break down and the current transformer may become inoperative.

In a typical aircraft generator, current transformers may be incorporated directly in the generator. Consequently, failure of one of the current transformers in the generator may result in a requirement to remove the generator from the aircraft to replace the defective current transformer.

As can be seen, there is a need to provide protection of current transformers from damage resulting from open circuit failures in a control unit to which the winding of the current transformer may be connected. Additionally, there is a need to assure that the current transformers may accurately detect fault conditions in protection zone.

SUMMARY OF THE INVENTION

In one aspect of the present invention, an electrical power system may comprise: a feeder between a power source and an electrical load; a first current transformer positioned at a first location on the feeder, the first current transformer comprising a first shunt resistor electrically connected across the first current transformer; a second current transformer positioned at a second location on the feeder; and a control unit interposed between the first and second current transformers; the control unit being interconnected with the first and second current transformers on current-monitoring loops independent from the feeder; the control unit being responsive to a predetermined differential in feeder (DF) current between the first and second current transformers to disconnect the power source from the electrical load; and the control unit comprising a compensation network for reducing DF error resulting from presence of the shunt resistor in the first current transformer.

In another aspect of the present invention, a protection system for a feeder may comprise: a first current transformer at a first location on the feeder; and a control unit that acts responsively to a predetermined DF to interrupt feeder current; wherein the first current transformer is connected to a first shunt resistor; wherein the control unit interrupts feeder current within a time period T after development of an open fault in a first current-transformer loop; and wherein the time T is less than a time period in which a rate of power dissipation within the first shunt resistor reaches a power dissipation rate limit for the first shunt resistor.

In still another aspect of the present invention, a method for operating an electrical power system may comprise the steps of: passing electrical power on a feeder from a power source to electrical loads through a first current transformer to produce a first monitoring current in a first current-transformer loop; passing a portion of the monitoring current through a first shunt resistor connected across the first current transformer; interrupting power passage on the feeder in the event of an open circuit fault in the first current-transformer loop; wherein the step of interrupting power passage is performed within a time T after development of an open fault in the first current-transformer loop; and wherein the time T is less than a time period in which a rate of within the first shunt resistor reaches a rated limit for power dissipation rate for the first shunt resistor.

These and other features, aspects and advantages of the present invention will become better understood with reference to the following drawings, description and claims.

BRIEF DESCRIPTION OF THE DRAWINGS

FIG. 7 is a flow chart of a method for operating an electrical system in accordance with an embodiment of the present invention.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide power systems in which protective shunt resistors may be incorporated into a current-transformer monitoring circuit or loop. More particularly, embodiments of the present invention may provide a methodology for utilizing such shunt resistors while minimizing adverse effects on accuracy of the monitoring system that may otherwise be produced by presence of the shunt resistors.

Figure 1:
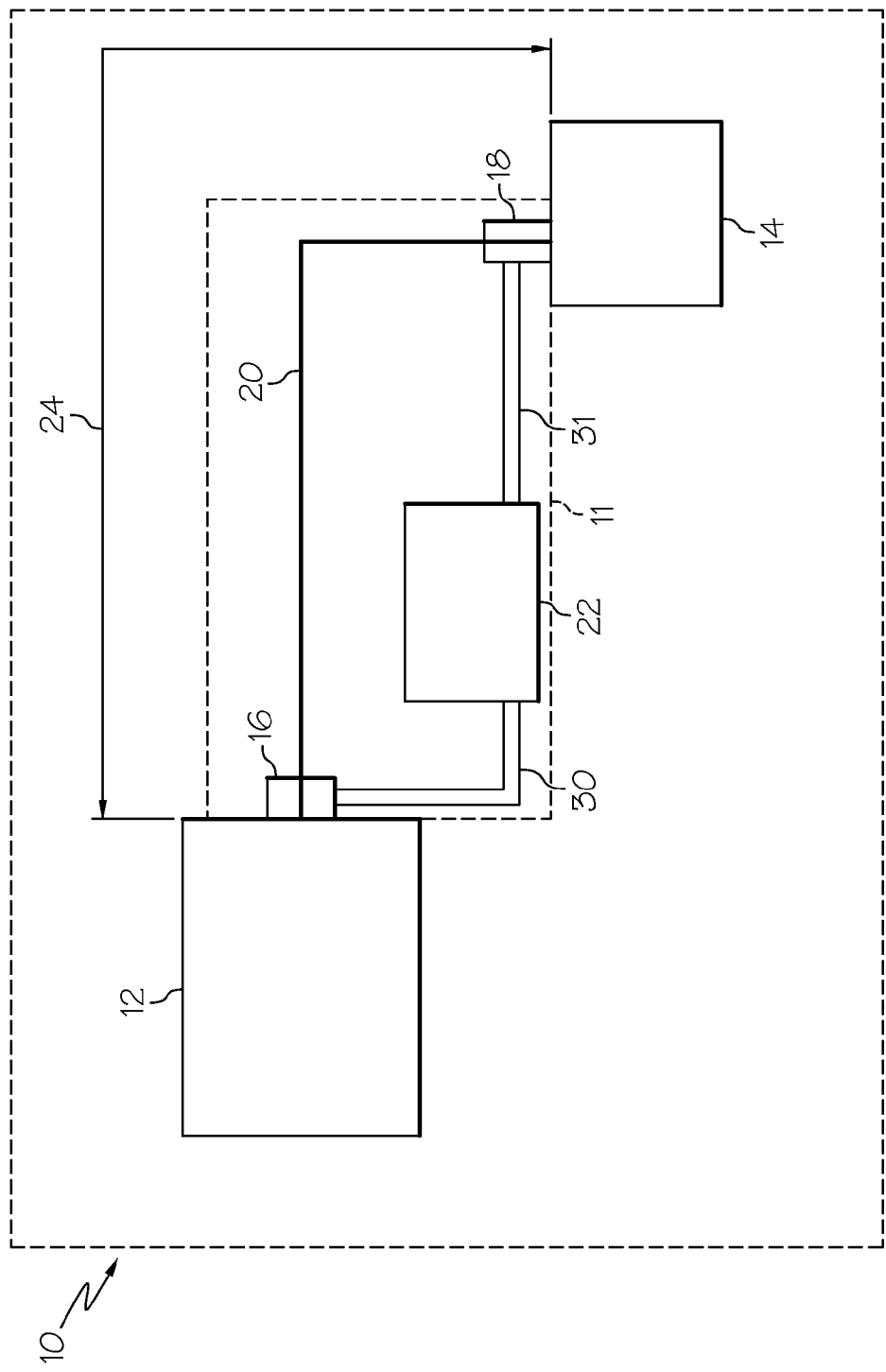
FIG. 1 is a block diagram of an electrical power system in accordance with an embodiment of the invention.

Referring now to FIG. 1, a block diagram may illustrate an exemplary embodiment of an electrical power system 10. The power system 10 may be, for example, a portion of a vehicular power system such as an aircraft power system. The power system 10 may comprise a power source 12 connected to electrical loads 14 through a feeder 20. The power system 10 may be provided with a feeder-protection system 11. In the case of a vehicular or aircraft power system the power source 12 may be an electric machine such as a generator or starter generator. The power system 10 may be a single phase system or a multi-phase system. For purposes of simplicity, the feeder 20 is shown in FIG. 1 as a single conductor. It is to be understood however that in the case of, for example, a three phase system the feeder 20 may comprise four conductors.

The feeder-protection system 11 may comprise a current transformer 16 positioned at or near the power source 12 and a current transformer 18 at or near the electrical loads 14. The current transformer at or near the power source 12 may be referred to as the power-source current transformer 16. The current transformer at or near the electrical loads 14 may be referred to as the remote current transformer 18. Portions of the feeder 20 between the power-source current transformers 16 and the remote current transformers 18 may be referred to as a protected zone 24.

It may be seen that the current transformer 16 may be interconnected to a control unit 22 on a current-monitoring loop 30. Similarly, the current transformer 18 may be interconnected to the control unit 22 on a current-monitoring loop 31. As current passes through the feeder 20, the current transformer 16 may develop a monitoring current that may be proportional to the current in the feeder 20. The current transformer 18 may develop a similar monitoring current. The control unit 22 may compare the monitoring currents of both of the current transformers 16 and 18. A differential between the monitoring currents of the current transformers 16 and 18 may be indicative of a differential in current along the feeder 20 and may be hereinafter referred to as differential feeder current or DF. If current in one of the current transformers, e.g., the current transformer 18, becomes lower than that of the current transformer 16, the control unit 22 may treat this condition as indicative of a short to ground in the feeder 20. In such an event, the control unit 22 may activate contactors (not shown) so that the protected zone 24 may be isolated. Similarly, phase-to-phase faults may also be isolated. Additionally, the power source 12 may be shut down so that damage to the power source 12 may be avoided.

Under some circumstances, the current-monitoring loop 30 may develop an open circuit fault. It may also be the case that current continues to flow in the feeder 20. Under these conditions, extremely high voltages may develop in a winding of the current transformer 16. Such high resultant voltage, in the order of Kilovolts, may damage insulation within the current transformer 16 and cause failure of the current transformer 16.

In some aircraft power systems, the current transformer 16 may be integral with the power source 12 (e.g., a generator). Failure of one or more of the current transformers 16 may result in a requirement to remove the generator from an aircraft and repair it.

Figure 2:
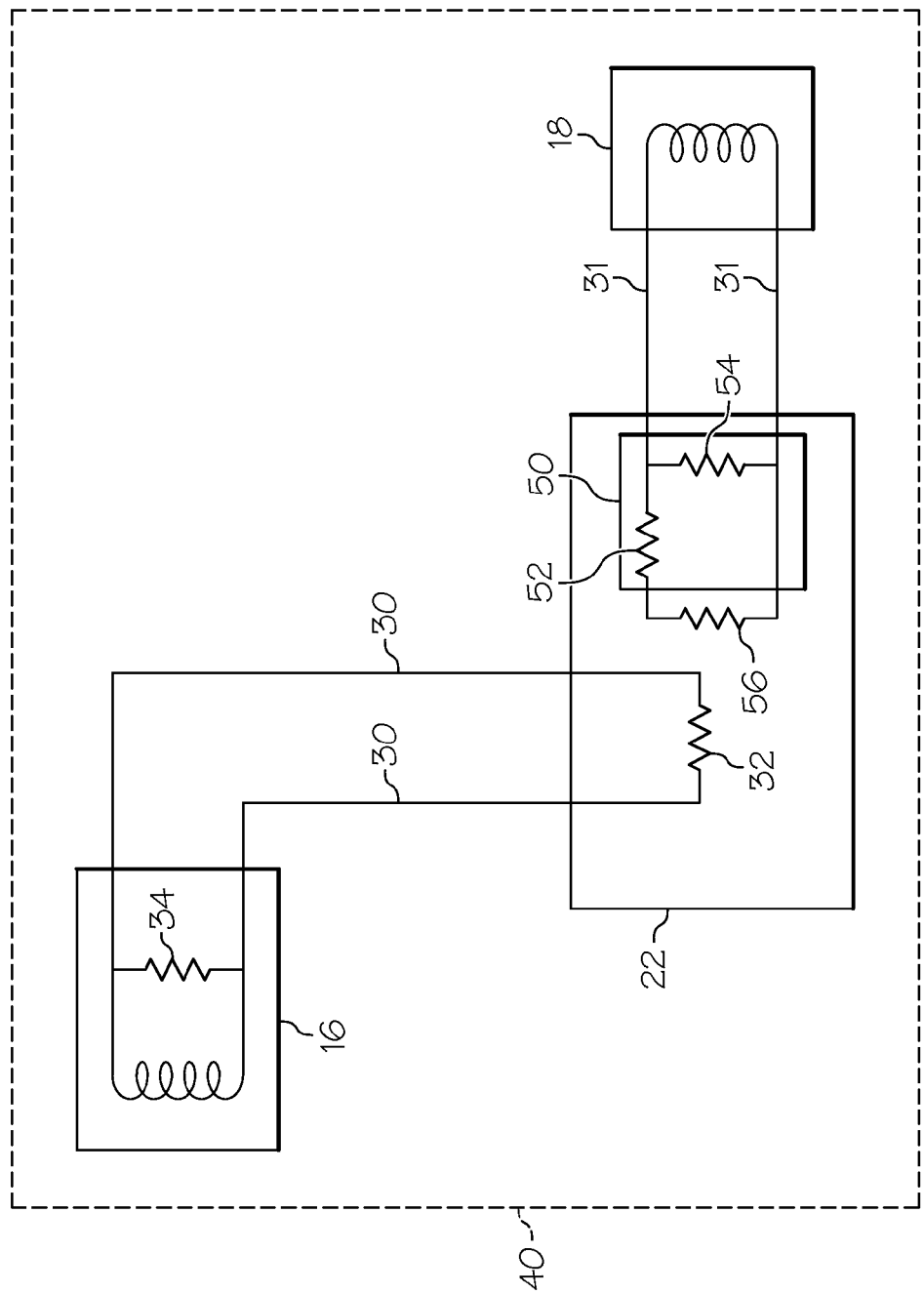
FIG. 2 is a block diagram of a current-transformer protection system in accordance with an embodiment of the invention.

Referring now to FIG. 2 an exemplary embodiment of a current-transformer protection system 40 may be seen. In the current-transformer loop 30, a burden resistor 32 may represent a resistive load that may be presented within the control unit 22. A parallel or shunt resistor 34 may be connected across the current transformer 16. In normal operation, the current transformer 16 may be presented with finite impedance, (e.g., the burden resistor 32). In the event of an open fault in the loop 30, the burden resistor 32 may no longer present finite impedance to the current transformer 16. However, the shunt resistor 34 may continue to present finite impedance to the current transformer 16 even if an open fault develops between the current transformer 16 and the burden resistor 32. Thus, even though current may continue flowing through the feeder 20, voltage across the current transformer 16 may not rise to a level that may damage insulation in the current transformer 16.

Figure 3:
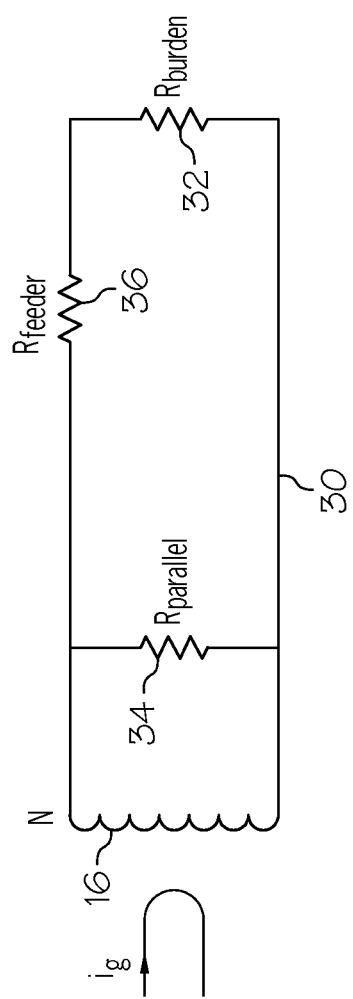
FIG. 3 is a model of a current-transformer loop in accordance with an embodiment of the invention.

Referring now to FIG. 3, it may be noted that a reduction in sensitivity in the loop 30 may arise from introduction of the shunt resistor 34. This may be understood by considering the following analysis of a model of the loop 30. A resistor 36 may represent resistance of the wiring between the burden resistor 32 and the current transformer 16. Current in the parallel or shunt resistor 34 may be determined in accordance with the expression:

$$I_{rparallel} = I_{generator}/N \times (R_{feeder} + R_{burden})/(R_{feeder} + R_{burden} + R_{parallel}); \quad \quad 1).$$

where $I_{rparallel}$ is the current through the resistor 34;
where $I_{generator}$ is the current through the main power feeder 20;
where $R_{feeder}$ is the resistance of the feeder wiring for the current transformer 16 (i.e. resistor 36);
where $R_{burden}$ is the resistance of the burden resistor 32; and
where $R_{parallel}$ is the resistance of the parallel resistor 34 which protects the current transformer from over-voltage during open circuit failure.

A current reading through the burden resistor 32 may be altered by presence of the shunt resistor 34. The magnitude of such alteration may be referred to as an error in reading and may be determined in accordance with the expression:

$$\text{Error in reading} = I_{parallel}/I_{generator}/N = (R_{feeder} + R_{burden})/(R_{feeder} + R_{burden} + R_{parallel}) \approx (R_{feeder} + R_{burden})/R_{paralel}; \quad 2).$$

where N is an effective number of turns in the current transformer 16 in the current transformer 16.

Figure 4:
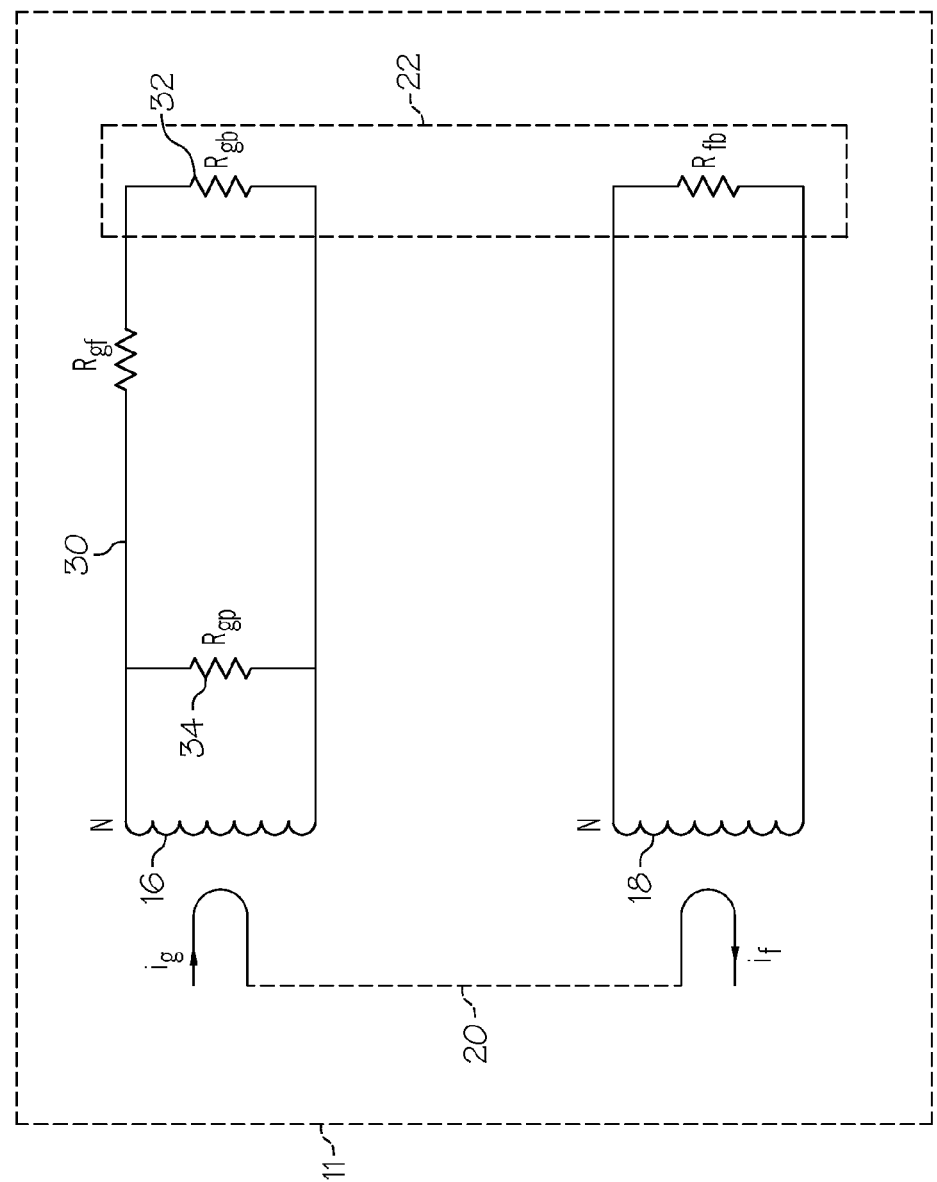
FIG. 4 is a block diagram of a feeder protection system in accordance with an embodiment of the invention.

Referring now to FIG. 4, it may be seen how the error in reading described above in equation 2 may affect sensitivity of the feeder protection system 11. An error in current differential between the current transformer 16 and the current transformer 18 may be expressed as:

$$I_{differential} \text{ error} = I_{gen} \times [(R_{gf} + R_{gb})/(R_{gf} + R_{gb} + R_{gp})]; \quad \quad 3).$$

where $I_{gen}$ is current through the main power feeder 20;
where $R_{gf}$ is resistance of the feeder wiring for the current transformer 16 (i.e. resistor 36 of FIG. 3);
where $R_{gb}$ is resistance of the burden resistor 32; and
where $R_{gp}$ is resistance of the parallel resistor 34, which protects the current transformer from over-voltage during open circuit failure.

In an example of application of the above analysis, the following table shows numerical relationships of various values of the resistor 34 and their effects on accuracy of the feeder protection system 11 (accuracy being equivalent to a variation in differential feeder current or DF).

TABLE 1

Current in the feeder 20 equals 210 Amps (A)

| Rparallel (Resistor 34) | DF Inaccuracy 1st sigma 84% probability | DF Error | Power Dissipation Watts |
|---|---|---|---|
| 50 | 15% | 31.5 | 3 |
| 100 | 8% | 16.8 | 5 |
| 200 | 4% | 8.82 | 10 |
| 300 | 3% | 6.3 | 14 |
| 500 | 2% | 4.2 | 25 |
| 1000 | 1% | 2.1 | 50 |

It may be seen that when the resistor 34 has a high value, then power dissipation may be high. Conversely when the resistor 34 may have a low value, power dissipation may be low, but inaccuracy may be high. In order to achieve a reasonable accuracy to meet aerospace requirements of +/−5 A of DF protection at 210A, the resistor 34 may need to be greater than 500 ohms. Such a resistor may produce high power dissipation and thus may be too large to fit in the generator 12.

Referring back now to FIG. 2, it may be seen that the current-transformer protection system 40 may incorporate a compensation network 50 which may diminish DF error when a low value one of resistors 34 may be employed as a protective shunt resistor in the current transformer 16. The compensation network 50 may comprise a series resistor 52 which may have a value that, when added to resistance of wiring between the current transformer 18 and the burden resistor 56, produces a net resistance equal to that of the resistor 36 of FIG. 3. The resistor 52 may be placed in the control unit 22 and connected in series with the current transformer 18. The resistor 52 may be selected so its resistance may be equal to the resistance of the resistor 36 of FIG. 3. The compensation network 50 may also comprise a shunt resistor 54 which may be placed in the control unit 22 and which may be connected across the current transformer 18. The resistance of the shunt resistor 54 may be equal to the resistance of the shunt resistor 34.

Figure 5:
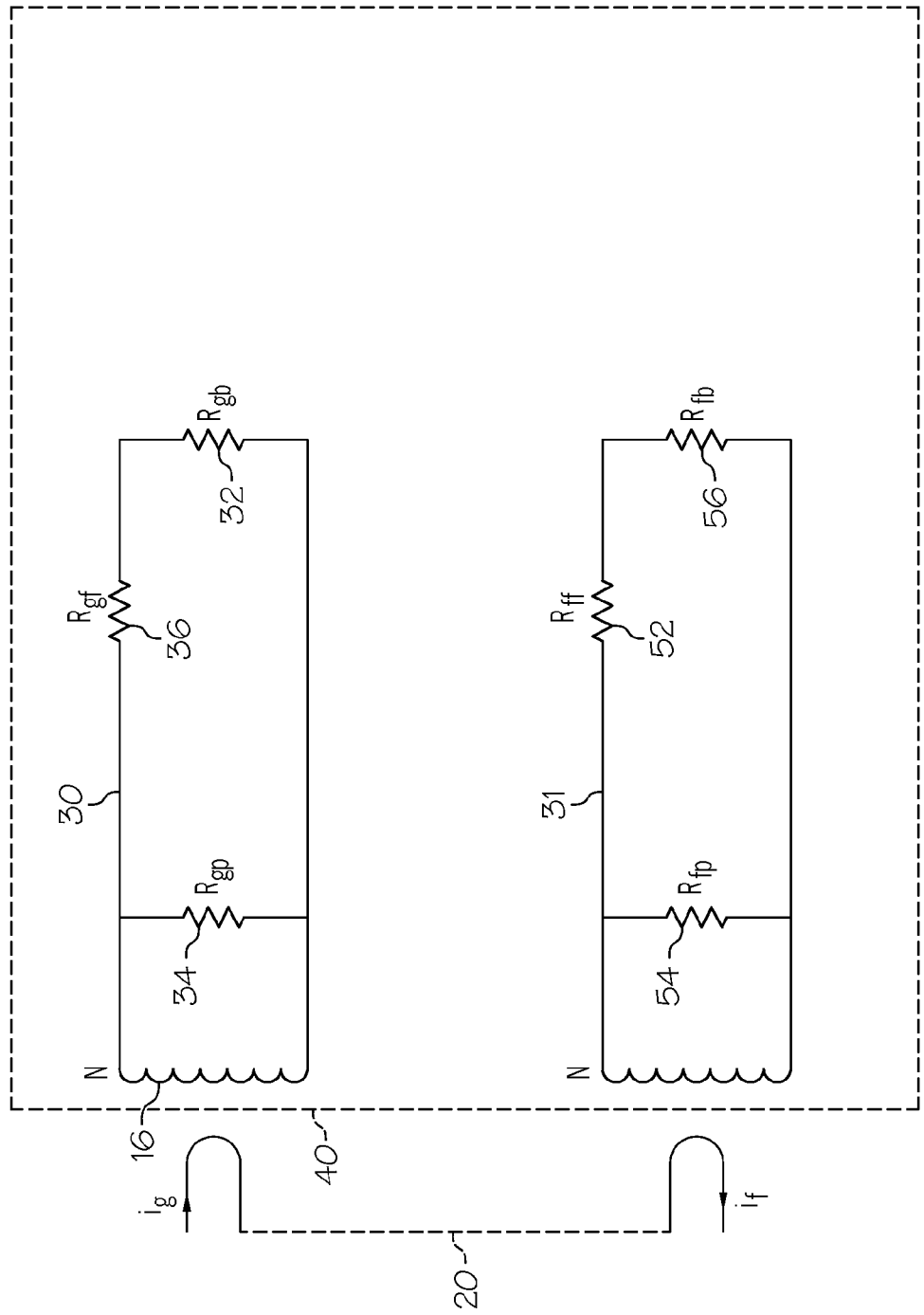
FIG. 5 is model of the current-transformer protection system of FIG. 2 in accordance with an embodiment of the invention.

Referring now to FIG. 5, which shows a model of the current-transformer protection system 40, it may be noted that through use of the compensation network 50, differential current error may be determined in accordance with:

$$I_{differential}\ error = I_{gen} \times [(R_{gf}+R_{gb})/(R_{gf}+R_{gb}+R_{gp})-(R_{ff}+R_{fb})/(R_{ff}+R_{fb}+R_{fp})];\quad 4).$$

where $R_{ff}$ is the combined resistance of wiring between the destination current transformer 18 (typically located in the distribution panel) and the compensation resistor 52;

where $R_{fp}$ is resistance of the parallel resistor 54 which is part of the compensation network 50;

where $R_{gp}$ is resistance of the resistor 34 which protects the current transformer 16 from over-voltage during open circuit failure; and where $R_{fb}$ is resistance of a burden resistor 56 used for sensing destination current.

In an example of application of the above described compensation network 50, the following table shows numerical relationships of various values of the resistor 34 and their effects on accuracy of the protection system (i.e., DF error). Table 2 may be illustrative of current in current-monitoring loop 20 being equal to 210 A.

TABLE 2

Inaccuracy with Compensation Network.

| Rparallel Resistor 34 | DF Inaccuracy 1st sigma 84% probability | Power Dissipation Watts |
|---|---|---|
| 50 | 1.60% | 3 |
| 100 | 0.90% | 5 |
| 200 | 0.50% | 10 |
| 300 | 0.30% | 14 |
| 500 | 0.18% | 25 |
| 1000 | 0.10% | 50 |

($R_{fp} = R_{gp}$, $R_{ff} = R_{gf}$)

It may be seen that adding of the compensation network 50 (with settings $R_{ff}=R_{gf}$ and $R_{fp}=R_{gp}$ at nominal values) inaccuracy may be reduced from 2% to 0.18% for a 500 ohm Rparallel resistor. (Compare Table 2 with Table 1 for 500 ohm Rparallel.)

Figure 6:
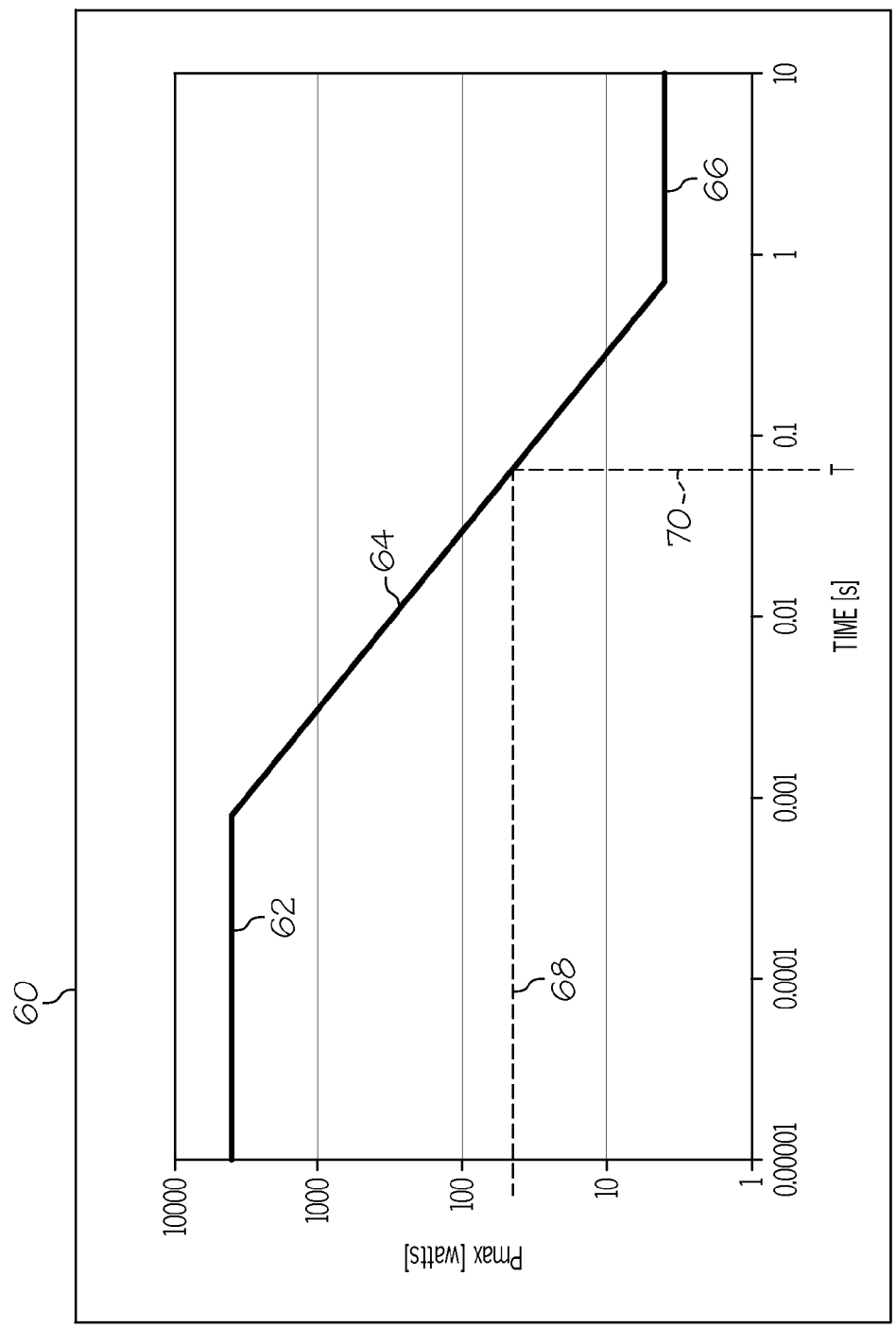
FIG. 6 is a graph illustrating a relationship between a rate of power dissipation of a shunt resistor and a power dissipation rate limit for the resistor in accordance with an embodiment of the invention.

Referring now to FIG. 6, it may be seen how operation of the current-protection system 40 may be further improved by limiting response time of the feeder protection system 11. A power rating graph 60 may illustrate how power rating of a nominally rated 4 watt (W) power resistor may vary as a function of time. A horizontal line segment 62 may illustrate that the 4 W resistor may be rated to dissipate power at a rate of about 5000 W for a brief period of time, about 0.001 seconds. After the brief period of about 0.001 seconds, the power rating of the resistor may diminish, along a sloped line segment 64, to a nominal power rating of 4 W; illustrated by a horizontal line segment 66.

A horizontal line 68 line may represent a power dissipation rate of about 25 W. The horizontal line 68 may intersect the line segment 64 at a time T represented by a vertical line 70. The time T may be about 0.08 seconds. Thus, the graph 60 may illustrate the concept that the 4 W resistor may be allowed to behave like a 25 W resistor for a period of time that may be less than about 0.08 seconds.

Referring back to Table 2 it may be seen that an exemplary embodiment of the system 40 may be provided with accuracy of about 0.18% while utilizing a 500 ohm resistor that may be rated for only 4 W. Of course the system must have a response time no greater than the time T, i.e., about 0.08 seconds. In other words, if feeder current is stopped within the time T of occurrence of an open failure, then the resistor 34 may be selected to have a resistance as great as 500 ohms while having a power rating of only 4 W. Such a resistor may be small enough to be readily placed in the generator 12.

Referring now to FIG. 7, a flow chart 700 may illustrate an exemplary method which may be employed to operate the electrical system 10 in accordance with an embodiment the invention. In a step 702, electrical power may be passed on a feeder from a power source to electrical loads through a current transformer to produce a monitoring current in a current-transformer loop (e.g., The generator 12 may produce power for transmission through the current transformer 16 and the feeder 20. The current transformer 16 may produce monitoring current in the current-transformer loop 30). In a step 704, a portion of the monitoring current may be passed through a shunt resistor connected across the current transformer (e.g., the portion of monitoring current which may pass through the shunt resistor 34 be determined in accordance with equation 1). In a step 706, an open fault may be detected in the current-transformer loop. In a step 708, power passage on the feeder may be interrupted in the event of an open circuit fault in the current-transformer loop. The step of interrupting power passage may be performed within a time T after development of an open fault in the current-transformer loop. The time T may less than a time period in which a power dissipation rate within the shunt resistor reaches a rated limit for power dissipation rate for the first shunt resistor, (e.g. the power dissipation of the shunt resistor 34 may be as great as the horizontal line segment 68 as long as the rated limit 64 for the resistor 34 is not exceeded).

It should be understood, of course, that the foregoing relates to exemplary embodiments of the invention and that modifications may be made without departing from the spirit and scope of the invention as set forth in the following claims.

We claim:

1. An electrical power system comprising:
   a feeder between a power source and an electrical load;
   a first current transformer positioned at a first location on the feeder, the first current transformer comprising a first shunt resistor electrically connected across the first current transformer;
   a second current transformer positioned at a second location on the feeder; and
   a control unit interposed between the first and second current transformers;
   the control unit interconnected with the first and second current transformers on current-monitoring loops independent from the feeder;
   the control unit responsive to a predetermined differential in feeder (DF) current between the first and second current transformers to disconnect the power source from the electrical load; and
   the control unit including a compensation network to reduce DF error resulting from the first shunt resistor electrically coupled across the first current transformer, the compensation network including a series resistor coupled with the second current transformer, the series resistor having a resistance value that, when added to a resistance value of wiring between the second current transformer and a burden resistor associated with the second current transformer, produces a net resistance value approximately equal to a wiring resistance between the first current transformer and a burden resistor associated with the first current transformer.

2. The power system of claim 1:
   wherein the power source is an electric machine; and
   wherein the first current transformer is incorporated in the electric machine.

3. The power system of claim 2 wherein the electric machine is a starter generator of an aircraft.

4. The power system of claim 1:
   wherein the compensation network comprises a second shunt resistor electrically connected across the second current transformer; and
   wherein the first and second shunt resistors have equal resistance values.

5. The power system of claim 1 wherein the compensation network comprises:
   a second shunt resistor, having a resistance value equal to that of the first shunt resistor, electrically connected across the second current transformer.

6. The power system of claim 1 wherein the compensation network is incorporated in the control unit.

7. A protection system for a feeder comprising:
   a first current transformer at a first location on the feeder;
   a control unit that acts responsively to a predetermined DF to interrupt feeder current;
   wherein the first current transformer is connected to a first shunt resistor;
   wherein the control unit interrupts feeder current within a time period T after development of an open fault in a first current-transformer loop;
   wherein the time T is less than a time period in which a rate of power dissipation within the first shunt resistor reaches a power dissipation rate limit for the first shunt resistor;
   a second current transformer at a second location on the feeder; and
   a compensation network connected to the second current transformer to compensate for DF error resulting from presence of the first shunt resistor,
   wherein the compensation network includes a series resistor coupled with the second current transformer, and
   wherein the series resistor has a value that, when added to a resistance value of wiring between the second current transformer and a burden resistor associated with the second current transformer, produces a net resistance value equal to a wiring resistance between the first current transformer and a burden resistor associated with the first current transformer.

8. The protection system of claim 7 wherein the compensation network comprises:
   a second shunt resistor electrically connected across the second current transformer.

9. The protection system of claim 8:
   wherein the second shunt resistor has a resistance value equal to that of the first shunt resistor.

10. The protection system of claim 7:
    wherein the first shunt resistor has a resistance that produces an DF inaccuracy no greater than about 0.18%; and
    wherein the first shunt resistor has a nominal power dissipation rating of no more than about 4 watts (W).

11. The protection system of claim 10 wherein the first shunt resistor has a resistance at least as high as 500 ohms.

12. The protection system of claim 7 wherein the first current transformer and the first shunt resistor are incorporated in a power source that supplies power to the feeder.

13. The protection system of claim 12 wherein the power source is a generator.

14. The protection system of claim 13 wherein the feeder is employed to supply electrical power to electrical loads in an aircraft.

15. A method for operating an electrical power system comprising the steps of:
    passing electrical current on a feeder from a power source to electrical loads through a first current transformer to produce a first monitoring current in a first current-transformer loop;
    passing a portion of the monitoring current through a first shunt resistor connected across the first current transformer;
    interrupting power passage on the feeder in the event of an open circuit fault in the first current-transformer loop;
    passing electrical current on the feeder via a second current transformer to produce a second monitoring current in a second current-transformer loop;
    monitoring a differential between the first and the second monitoring currents; and
    passing a portion of the second monitoring current through a series resistor of a compensation network coupled with the second current transformer to reduce error-producing effects of the first shunt resistor, wherein the series resistor has a value that, when added to a resistance value of wiring between the second current transformer and a burden resistor associated with the second current transformer, produces a net resistance value approximately equal to a wiring resistance between the first current transformer and a burden resistor associated with the first current transformer, wherein interrupting power passage on the feeder is performed within a time T after development of an open fault in the first current-transformer loop; and wherein the time T is less that a time period in which a rate of within the first shunt resistor reaches a rated limit for power dissipation rate for the first shunt resistor.

16. The method of claim 15 wherein:

the first shunt resistor has a resistance that has an error-producing effect no greater than about 0.18%;

the first shunt resistor has a nominal power dissipation rating of no more than about 4 watts (W);

the first shunt resistor has a resistance at least as high as 500 ohms; and the time T is less than about 0.1 seconds.

* * * * *